United States Patent [19]

Briehl

[11] Patent Number: 5,402,879
[45] Date of Patent: Apr. 4, 1995

[54] DRIVE SYSTEM FOR FLIGHT CONVEYORS AND METHOD OF OPERATING SAME

[75] Inventor: Gerhard Briehl, Bocholt, Germany

[73] Assignee: Dorstener Maschinenfabrik Aktiengesellschaft, Dorsten, Germany

[21] Appl. No.: 165,089

[22] Filed: Dec. 10, 1993

[30] Foreign Application Priority Data

Dec. 12, 1992 [DE] Germany .......... 42 41 972.7
Nov. 29, 1993 [DE] Germany .......... 43 40 251.8

[51] Int. Cl.⁶ .............................................. B65G 23/00
[52] U.S. Cl. ................................................... 198/832
[58] Field of Search .......................................... 198/832

[56] References Cited

U.S. PATENT DOCUMENTS

| | | | |
|---|---|---|---|
| 2,316,015 | 4/1943 | Owens et al. | 198/832 X |
| 2,625,257 | 1/1953 | Schenk | 198/832 X |
| 3,500,990 | 3/1970 | Vogt et al. | 198/832 X |
| 4,356,900 | 11/1982 | Sommer | 198/832 X |

FOREIGN PATENT DOCUMENTS

| | | | |
|---|---|---|---|
| 3635851 | 5/1988 | Germany | 198/832 |
| 3936936 | 5/1990 | Germany | 198/832 |
| 3211109 | 9/1991 | Japan | 198/832 |

*Primary Examiner*—James R. Bidwell
*Attorney, Agent, or Firm*—Herbert Dubno

[57] ABSTRACT

A drive station for winning machines and scrape chain conveyors used in mining operations, with main drive and auxiliary drive, and with a measuring and control unit for drive motors and safety slipping clutches. During heavy start and heavy run respectively, a control sensor detects the undershooting of a limit speed of the drive motors, which is preselectable according to a program, and a drive control shifts simultaneously or successively into a slow speed step. Moreover, the drive force of the safety clipping clutches can be adjusted during the starting process.

12 Claims, 5 Drawing Sheets

TENSIONED CHAIN

SLACKENED CHAIN

DRIVE SYSTEM FOR FLIGHT CONVEYORS AND METHOD OF OPERATING SAME

FIELD OF THE INVENTION

My present invention relates to a drive for mining machinery, especially winning machines and scraper chain conveyors used in mining operations. More particularly the invention relates to a drive system comprising a main drive and an auxiliary drive, each equipped with drive motor, gearing or transmission, controllable safety slipping clutch, and a measuring and control unit for controlling the drive motors and safety slipping clutches.

BACKGROUND OF THE INVENTION

Problems with startup and in particular with the so-called heavy start of scraper chain conveyors and winning machines are solved only unsatisfactorily with current pole-changing drive motors and diesel engines with steep characteristic curves inherent to such units. Although a drive system for so-called heavy start and heavy run, respectively, is already available for use with pole-changing (speed-changing) drive motors having an increased torque in low speed steps, this operating method also required especially the elimination of loose chains or sagging chains and shock loads on chains and driving parts of winning machines, scraper chain conveyors and the like.

The use of a power shift gear substantially increases the shock loads, i.e. the torques transmitted to driving parts and chain by the motor in the low step of the power shift gear. In fact, efforts have been made to protect heavy start or heavy run by using variable hydrodynamic couplings but the large space required for the ducts for the operating fluid and for the cooling thereof is a disadvantage.

Moreover, the secondary wheel and the rapidly running gear shaft of the secondary transmission give unfavorable results at least on sudden braking, e.g. on sudden blocking or erratic load increases, because of the high centrifugal force. In addition, a continuous power loss must be accepted due to unavoidable permanent slipping.

OBJECTS OF THE INVENTION

It is an object of the invention to provide an improved drive system for winning machines and scraper chain conveyors used in mining operations which is capable of heavy start and heavy run, respectively, and which avoids loose chains such as planing chains or conveyor chains as well as sagging chains.

Another object of my invention is to provide an improved drive system for a flight conveyor or the like which can be subjected to heavy load and slackening of the conveyor chains, whereby drawbacks of earlier drive systems, especially slackening of the chain and stalling on heavy load can be avoided.

It is also an object of this invention to provide an improved method of operating a flight conveyor or like system to facilitate start-up and running thereof, especially with the aid of motors having one or more speeds.

Still a further object of the invention is to provide an improved system, method or apparatus for driving a flight conveyor or the like chain arrangement which will facilitate heavy load starting and nevertheless reduce shocks and sudden load fluctuations, thereby overcoming drawbacks of prior art systems.

SUMMARY OF THE INVENTION

These objects are attained, according to the invention, by providing a control sensing means which detects undershooting of a limiting speed of the drive motors, which is preselectable according to a program, whereby a drive control simultaneously or due to the detection shifts the main drive and auxiliary drive and vice versa, respectively, into a slow speed stop. Moreover, the shifting again into the fast speed step is effected after a limiting speed of the slow speed step preselectable according to a program has been exceeded.

Within the scope of the invention, for initiating the shifting into the slow speed step, the control sensor can detect the thermal load of the drive motors from the temporal course of the speed drop and compare it with the cooling available for the drive motors in order to prevent inadmissible heating and early disconnecting of the drive motors.

According to the invention, in addition, the safety slipping clutch of one of the two drives (main drive or auxiliary drive)—or the safety slipping clutches of both drives (main drive or auxiliary drive)—can be set in slipping motion simultaneously or successively and closed again after acceleration of the drive motors on reaching a low limit speed preselectable according to a program, or on moving into smooth blocking after undershooting of a low limit speed preselectable according to a program in the fast and slow speed step. "Smooth Blocking" within the scope of the invention means steady load increase in contrast to hard blocking which is associated with an erratic load increase.

In drive systems having safety slipping clutches in the range of steep characteristic curves of drive motors typically used in mining operations, normally asynchronous motors, a load compensation control is effected on the currently more highly loaded drive motor by defined, short-time slipping after power comparisons and comparison of current consumption, respectively, with overloading a scraper chain conveyor with for instance coal, rubbish and the like.

Then, if the load on the drive motors increases more, a "Heavy Run" occurs or the scraper chain conveyor moves into a so-called "Smooth Blocking." On undershooting the limit speed, which is preselectable according to a program, as detected by the control sensing means of the drive station, the drive control automatically shifts the main and/or auxiliary drive simultaneously or successively into the slow speed step. The limit speed may typically be before, but also behind the breakdown torque as highest torque of the drive motors. After a "Relieving Motion" of the scraper chain conveyor in the slow speed step, automatic shifting into the fast speed step occurs after an upper limit speed of the slow speed step has been reached, whereby the upper limit speed of the slow speed step is selected according to a program, taking into account the torque sequence in the fast speed step.

If the speed decreases further, the drive station moves into smooth blocking, and the safety slipping clutch of one of both drives or both drives (main and auxiliary drive) are simultaneously or successively moved into slipping by controlled clutch thrust, and then closed again after previous load compensation control for full utilization of the drive motors on reaching the lower limit speed of the fast or slow speed step preselectable according to a program in drive stations with safety slipping clutches according to the invention.

The rotary energy of the drive motor to overcome blocking is optimally used in addition to the breakdown torque. Moreover, incalculable shock loads and impact loads respectively on the chain, e.g. by sudden tension of the chain band, do not occur. The drive station will be disconnected if a steady operation cannot be achieved in spite of programmed force increase at the concerned safety slipping clutch, and the control process can be repeated if required.

The blocking cause must be eliminated before a new start. With erratic load increases, e.g. on moving into a hard blocking, the safety slipping clutch of the uncontrolled drive (main drive or auxiliary drive) functions as overload protection for the chain and drive station.

According to a preferred embodiment of the invention with independent significance, the force of the safety slipping clutches during starting or heavy running or on smooth blocking is independently adjustable, continuously or in progressive steps.

In order to prevent inadmissible heating and thus disconnection of the drive motors, the drive control detects, in addition to the limit speed, also the thermal load on the drive motors before initiating the shifting into the slow speed step in heavy runs or in passing into smooth blocking. The thermal load is determined either directly or from the temporal course of the speed drop detected by the control sensory means and evaluated in the drive control. The thermal load is compared with the currently available cooling. If required for heavy running operations, the coolant flow rate can be increased automatically and temporarily by means of the drive control.

Moreover, hardwired temperature measuring heads may be inserted directly between the disks of the fixed disk carrier of safety slipping clutches designed as multi-disk clutches in the drive unit according to the invention.

In addition, the wear condition of multi-disk clutches and safety slipping clutches, respectively, can precisely be detected by means of hardwired proximity switches in the form of transducers via changed piston positions of the closed multi-disk clutches and safety slipping clutches respectively.

The measured values can then be transmitted to the measuring and control unit for evaluation. Such measures are recommended if temperature course and wear condition of safety slipping clutches and their clutch disks must be accurately determined, for instance on engaging safety slipping clutches during the starting process and, in the case of multiple drives, on engaging safety slipping clutches or multi-disk clutches in temporal sequence.

In method terms, a method of operating a fluid conveyor or like chain drive for mining and like processes can comprise:
 (a) progressively coupling a main drive motor at a low speed through a slip clutch to sprockets of the conveyor at a downstream end in a direction of displacement of the conveyor;
 (b) progressively coupling an auxiliary drive motor through a slip clutch to the conveyor at an upstream end thereof, thereby driving the conveyor;
 (c) measuring slip at the slip clutch of the auxiliary drive motor to pressurizing the slip clutches in response to the measured slip, thereby increasing the coupling of the motors with the conveyor while maintaining chains thereof taut; and
 (d) detecting a speed of at least one of said motors and upon the detected speed undershooting a lower limiting speed of a high-speed setting switching the motors to a lower speed and upon overshooting an upper limiting speed of a low-speed setting shifting the motors to a higher speed.

In the method of the invention, therefore, the thermal load on the or each motor can be determined by measuring speed drop as a function of time and when the calculated thermal load exceeds the available cooling capacity, the drive motor or motors can be shifted into the low-speed step. Of course, a separate heat sensor can be provided to detect the thermal loading of the motor.

According to another feature of the invention, the clutches are open upon the detection of a limiting lower speed in the fast or slow speed range of each motor, thereby allowing slip between that motor and the load and acceleration of the respective motor, whereupon the clutch is again closed, slipping is limited and a more direct coupling is effected between that motor and the load, i.e. its sprockets.

The slip clutches are controlled continuously or progressively in steps, adjusting the force or pressure of the slip clutch according to a feature of the invention.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
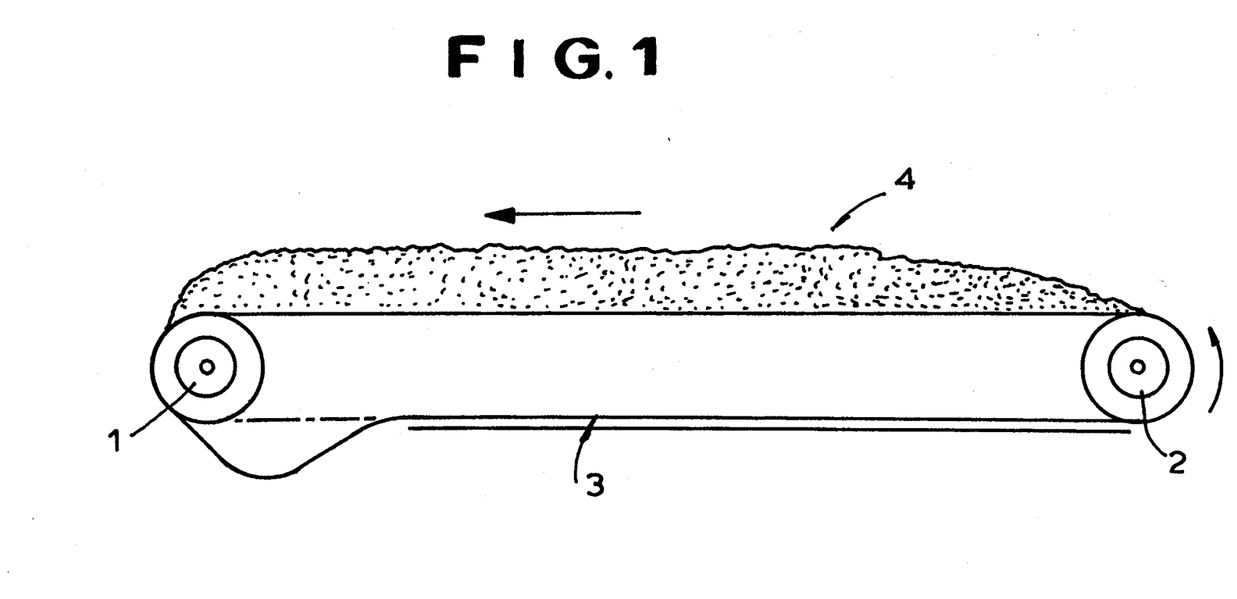
FIG. 1 is a diagrammatic side view of a scraper or flight chain conveyor with drive stations according to the invention, showing a sagging chain.
Figure 2:
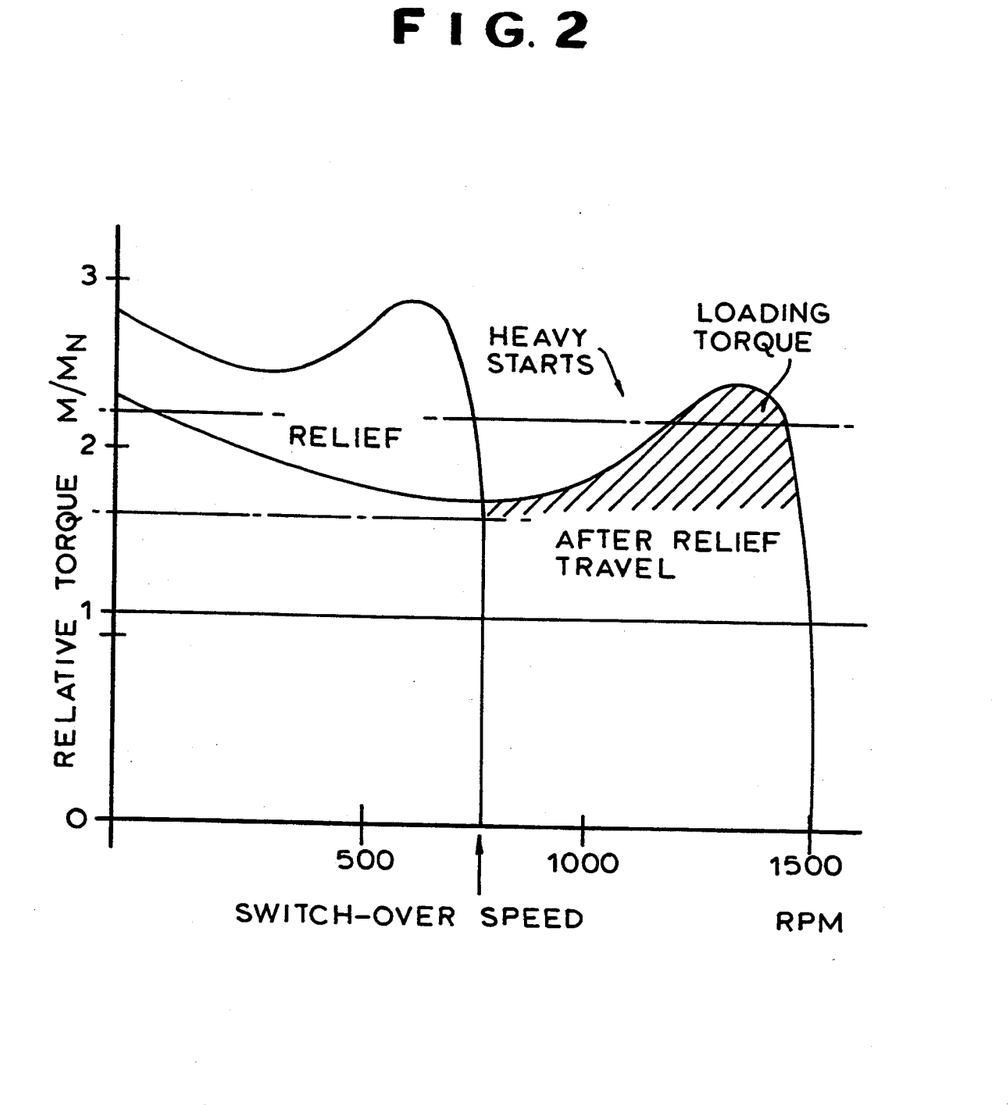
FIG. 2 is a graph of a starting process to prevent the chain from sagging or becoming loose in the trough of a flight chain conveyor.
Figure 3:
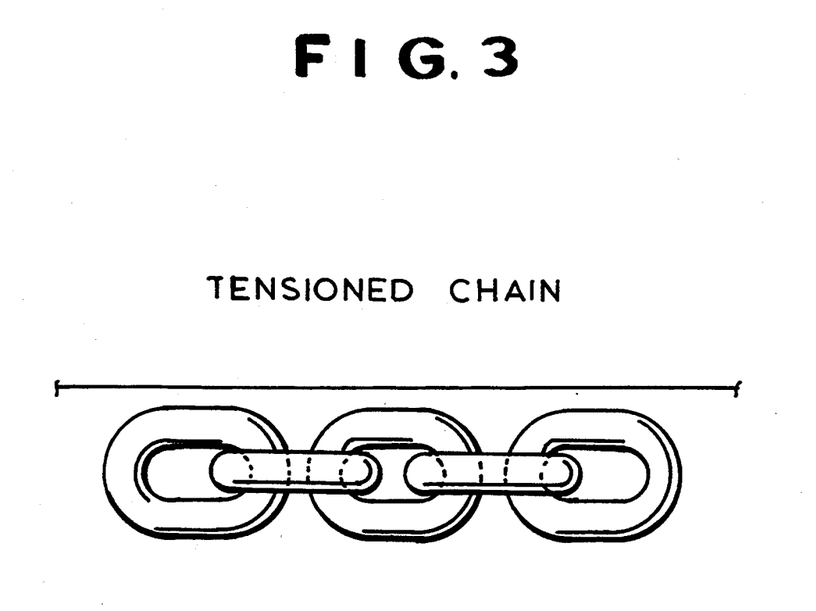
FIG. 3 is a side view of a tightened chain in a chain guiding mechanism.
Figure 4:
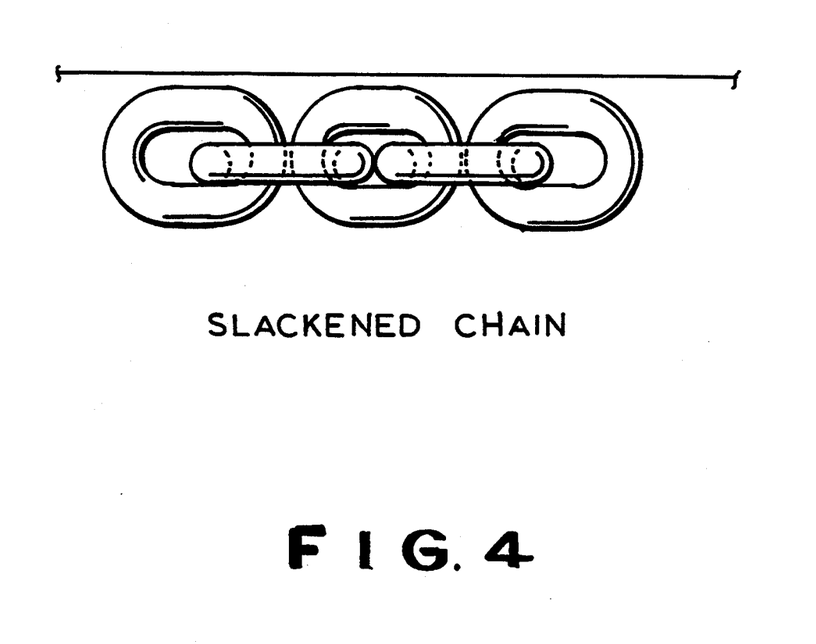
FIG. 4 is a side view of a loose chain in a chain guiding mechanism.
Figure 6:
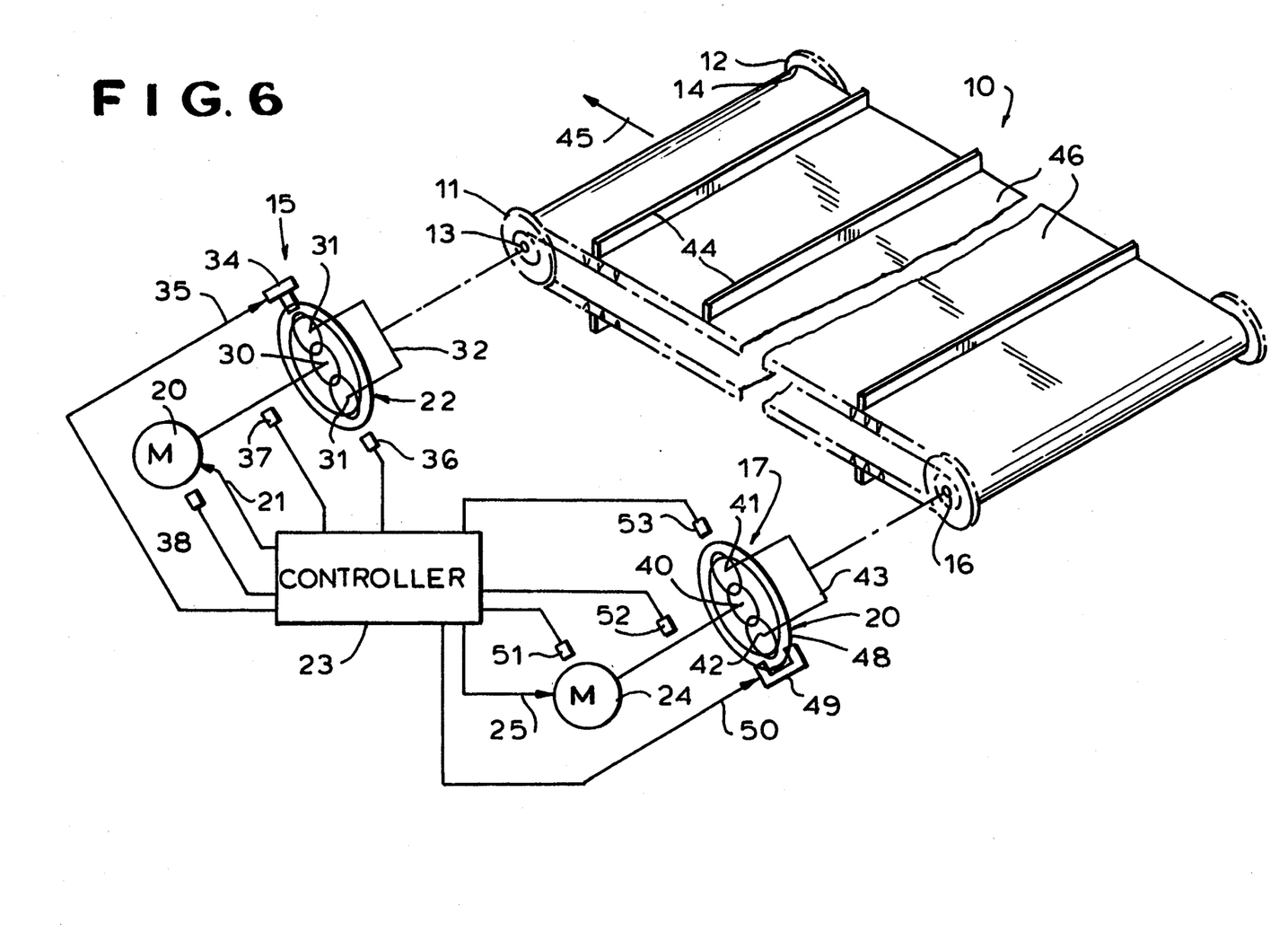
FIG. 6 is another diagram illustrating elements of the drive system of the present invention.

Before discussing the sequence of operations in a drive system of the invention, utilizing reference to FIG. 1 to show a loaded flight conveyor in diagrammatic form and FIG. 2 to show graphically the relative torque plotted along the ordinate in terms of the ratio between the actual torque and the nominal torque during start-up versus the speed in RPM of the motor and showing the switchover speed (switch over between low speed and high speed), reference may be had to FIG. 6 which illustrates in highly diagrammatic form some of the elements of the drive system and with respect to which some of the principles of the invention will be discussed.

The flight conveyor is shown at 10 in FIG. 6 and can be seen to comprise a pair of chains 11 and 12 which pass over sprockets 13 and 14 driven by the main drive unit 15 and another pair of sprockets, one of which is shown at 16 driven by the auxiliary drive unit 17.

Figure 5:
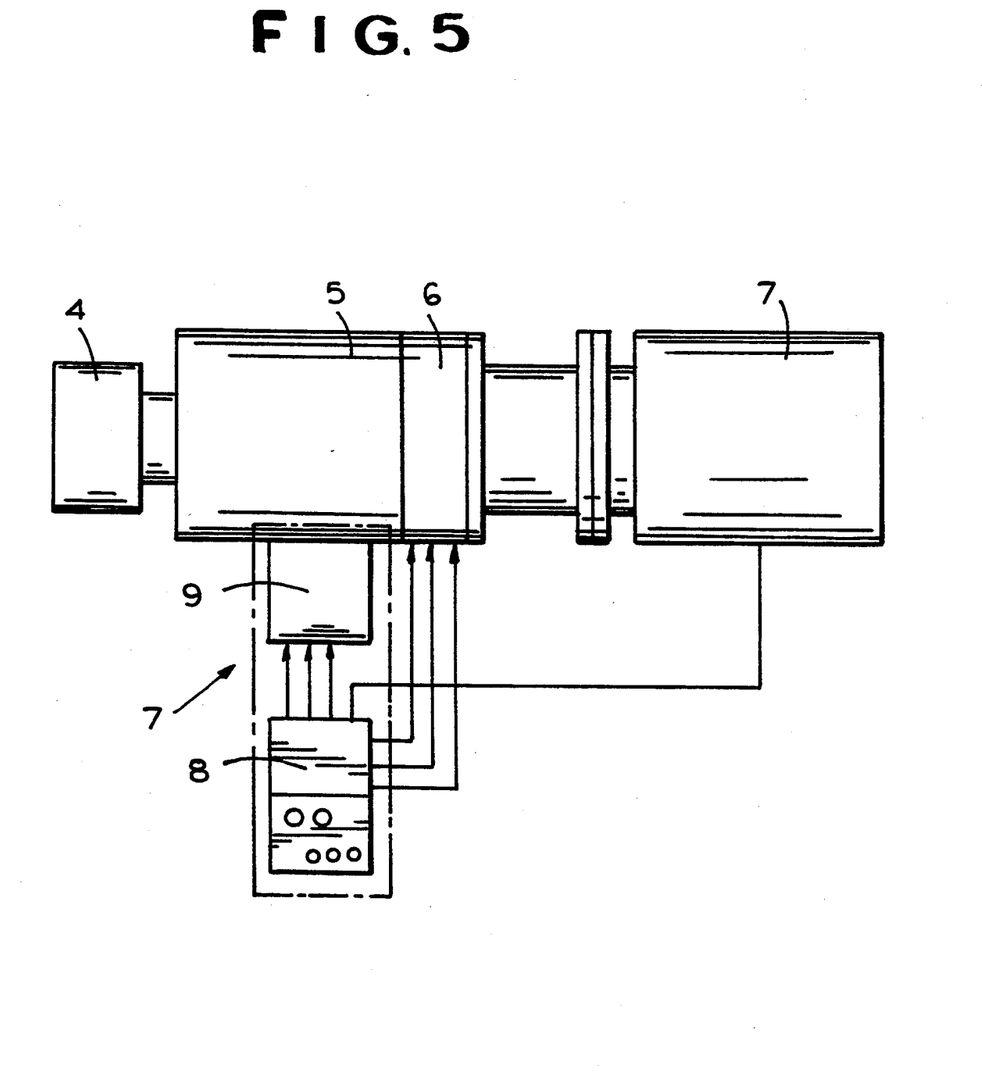
FIG. 5 is a diagram of a drive station according to the invention.

In FIGS. 1–5, of course, the main drive is represented at 1, the auxiliary drive at 2, the conveyor at 4 and the chains generally at 3, the elements of each drive system being indicated diagrammatically in FIG. 5 as including the respective motor 1 or 2, the slipping clutch 6, the transmission 5 and the control unit 7.

Returning to FIG. 6, it will be apparent that the main drive unit includes, in addition to the motor 20 which can be a two-speed motor having a speed control input at 21, a gear transmission 22 and a controller 23 which may be common to the controller of the auxiliary drive unit 17. That drive unit can have a motor 24 whose speed control input is represented at 25, and a gear transmission 26.

The transmission 22 is, of course, equivalent to the transmission 5 for the main drive unit illustrated in FIG. 5 and discussed in greater detail subsequently. The transmission 26 may be equivalent to a corresponding gear transmission of the auxiliary drive unit.

While each transmission can include fixed gearing of the branched-path or multiple shaft type, it has been found to be advantageous to provide planetary speed reduction gearing as has been diagrammatically illustrated. Thus in FIG. 6 the transmission 22 is shown to have a sun gear 30 driven by the motor 20 and meshing with a pair of planetary gears 31 on a planet carrier 32 connected to one set of sprocket wheels 13, 14 driving the chains 11 and 12 of the flight conveyor. The planet gears 31 and 32 mesh with a ring gear 33 which can transmit force to a housing through a slip clutch 34 which can be operated by hydraulic or pneumatic pressure as represented at 35 by the controller 23. The hydraulic or pneumatic pressure which is applied to the clutch controls the slip. The slip itself is measured by a sensor 36 which feeds pulses to the controller 23 representing the slip. A zero pulse rate, of course, represents zero slip.

The sensing means for the main drive unit also includes a sensor 37 of the motor speed for the motor 20. As noted, the controller 23 can calculate the thermal load on the motor 20 by measuring the time course of any speed reduction caused by the load on the motor. In some cases, however, it may be advantageous to provide a thermal load detector 38 which measures the temperature increase in the motor and supplies an input representing the thermal loading to the controller 23.

Correspondingly the transmission 26 may have a sun gear 40 driven by the motor 24 and meshing with planet gears 41 and 42 on a planet carrier 43 connected to the sprocket wheel 16 at the other end of the fluid conveyor.

The chains 11 and 12 may be bridged by scrapers or flights 44 entraining the excavated material ahead of them in the direction of the arrow 45 on a surface 46 when the conveyor is operated.

A ring gear 48 meshes with the planet gears 41 and 42 and has a slip which is controlled by the slip clutch 49 receiving a fluid medium under pressure at 50 as determined by the controller 23.

The sensor 51 measures the thermal loading of the motor 24, which thermal loading can be calculated by the controller from the reduction in speed on loading over time, if desired. A speed sensor 52 is provided for the motor 24 and a sensor 53 measures the slip of the ring gear 48 allowed by the clutch 49.

In a typical operation, the motor 20 is turned on and initially the ring gear 33 free wheels because the clutch 34 has not yet coupled it to the load, namely, the flight conveyor 10. The clutch 34 is then engaged and motor 24 is energized with its clutch 49 engaged, thereby tightening the chains and effecting drive. Since the main drive motor initially takes up the load, assuming that it can advance the conveyor without the heavy start drag, the clutch 49 will slip and pulses generated by the sensor 53 will initiate through the controller 23 increased pressure in the clutch 34 and increase pressure in the clutch 49, thereby increasing the coupling between the main and the auxiliary motors and the flight conveyor to drive the conveyor. The relative torque drops rapidly as the speed of the conveyor increases and the speed change to the high-speed mode can be initiated at an appropriate point (see the graph of FIG. 2). The flight conveyor is then operated at its higher speed.

Should, in the high speed operating range, the load on either or both of the motors increase to cause a speed drop below a certain lower limit, switchover to the low speeds of the two motors will be effected by the controller.

The heavy start condition will be described in greater detail below in connection with FIGS. 1 and 2.

Referring to FIGS. 1 and 2, a starting process to prevent a chain from sagging or becoming loose in the trough of a scraper or flight chain conveyor with low prestress or heavy start will now be described by way of example only:

1. Normal Start.
1.1. Acceleration of drive motor 1 for main drive without load.
1.2. Acceleration of drive motor 2 for auxiliary drive with reduced clutch thrust,
   chain trough 3 is tightened,
   clutch of auxiliary drive slips.
1.3 The slip pulses of the auxiliary drive initiate the pressure force increase for the safety slipping clutches on main and auxiliary drive via the drive control.
1.4 The force of the safety slipping clutches, e.g. multi-disk clutches, is increased by the program until no more slip pulses occur.
1.5. The drive control shifts from "starting" mode into normal operating mode.

The drive control disconnects the drive motors 1, 2 again and switches to "Heavy Start" mode, if the programmed clutch force increase to stop slip at the safety slipping clutches, i.e. slip pulses continue to occur.

2. Heavy Start.
2.1. Steps 1 to 1.3 in normal start.
2.2. According to the "Heavy Start" program the pressure force of the safety slipping clutches is momentarily increased to values which allow to transmit the motor breakdown torque to main and auxiliary drive. With further increase in the force, the starting process can be supported additionally by the rotary energy of drive motors 1, 2.

Regardless of the above example the pressure force of the safety slipping clutches is controlled after free acceleration of drive motors 1, 2 on main and auxiliary drives in such a way that the torque of the driving chain starwheels, and thus the starting acceleration of the concerned chain and conveyor chain respectively can be adapted to the respective operating condition of the scraper chain conveyor
   a) according to the type of load, and
   b) according to the starting resistance (e.g. after extended standstill) to be expected.

Regarding the pole-changing of the drive motors 1, 2, this may take place in the high as well as in the low speed step. Various starting programs in the control device are available for this purpose. If the preselected starting program does not bring about a start, the effective data of the starting attempt such as slip course of the safety slipping clutches (e.g. pulse sequence), power characteristic and power consumption respectively of the drive motors 1, 2 of main and auxiliary drive are automatically converted into a program sequence (e.g. heavy start) in an evaluation unit of the control unit which is more likely to result in starting.

With specified prestress of the conveyor chain, a controlled starting process prevents the occurrence of so-called loose chains and sagging chains respectively.

There is a controlled pressure build-up in the safety slipping clutches, e.g. corresponding to the temporal slip pulses of the respective safety slipping clutch and the speed values sufficient for the drive speed respectively, which are evaluated in the measuring and control unit and detected by the control sensing means, and which may be different for main and auxiliary drive, accelerates the flight chain conveyor in accordance with the program until the safety slipping clutches do not slip any more, and the full speeds are transmitted to the starting shafts via the safety slipping clutches. From then on no additional efficiency loss due to slipping occurs.

If the occurrence of a so-called loose chain and sagging chain respectively cannot be prevented, e.g. with insufficient prestress of the conveyor chain or overloaded flight chain conveyor, a programmed tuning of the main and auxiliary starting processes, initiated by the drive control, deposits the loose or sagging chain section on the scrape chain conveyor in such a way that this loose or sagging chain section is harmless for the ongoing operation of the scrape chain conveyor and does not interfere with it.

Shock loads on conveyor chain and driving parts, e.g. by suddenly tightening the loose conveyor chain on starting the scrape chain conveyor, are prevented after load-free acceleration of drive motors 1, 2 by the controlled pressure build-up in the safety slipping clutches, even when using drive motors 1, 2 and asynchronous motors respectively having a steep characteristic curve, whereby the rotary energy of the drive motors 1, 2 for electric motors respectively to bring about the starting processes is not required. Therefore, operating costs are minimized.

FIG. 5 shows a drive station according to the invention applicable to the main drive as well as for the auxiliary drive. This drive station for a winning machine and for a scrape chain conveyor 4 respectively comprises a drive motor 1 and a step-down transmission 5 as well as a safety slipping clutch 6 operable by a pressure means (e.g. compressed air or hydraulic medium). The gear 5 may include branching gearing and a planetary gearing respectively. The safety clipping clutch 6 can be a multi-disk clutch. The safety clipping clutch 6 is in any case equipped with a slip monitor as transducer for a measuring and control unit 7 to actuate the safety clipping clutch 6. The safety slipping clutch 6 in the embodiment example is concentrically arranged within the transmission path and transmits a supporting torque of either the hollow wheel or of the planet carrier of the gear designed as planetary gear to the gearbox casing. The measured values supplied to the control unit are electronically evaluated. On overshooting the correspondingly allocated specified value, the measuring and control unit 7 actuates safety slipping clutch 6 and drive motor 1 by means of an electronic control 8 and, as required, with an in-line arranged hydraulic and pneumatic control 9 respectively.

I claim:

1. In a drive system for winning machines and flight chain conveyors used in mining operations, said drive system comprising a main drive and an auxiliary drive, each having a drive motor, a gear transmission, a controllable safety slipping clutch, and a measuring and control unit for main and auxiliary drive to control the drive motors and the safety slipping clutch, the improvement which comprises:

a control sensory means detecting undershooting of a limiting speed of the drive motors, which is preselectable according to a program;

a drive control which shifts simultaneously or successively into a slow speed step, whereby after overshooting a limit speed of the slow speed step, which is preselectable according to a program, shifting again into the fast speed step is effectuated; and means for detecting a thermal load on the drive motors from the temporal course of a speed drop and comparing said thermal load with the cooling available for the drive motors in order to prevent inadmissible heating and early disconnection of the drive motors when initiating the shifting into the slow speed step.

2. The improvement defined in claim 1 wherein the safety slipping clutch of one or both drives or the safety slipping clutches of both drives simultaneously or successively are caused to slip on reaching a lower limit speed in the fast or slow speed step, which is preselectable and closed again after acceleration of one or both drive motors.

3. The improvement defined in claim 1 wherein said measuring and control unit controls one of the drives and the other drive with its safety slipping clutch affords overload protection for chain and drive system.

4. A method of operating a flight conveyor which comprises the steps of:

(a) progressively coupling a main drive motor at a low speed through a slip clutch to sprockets of said conveyor at a downstream end in a direction of displacement of said conveyor;

(b) progressively coupling an auxiliary drive motor through a slip clutch to said conveyor at an upstream end thereof, thereby driving said conveyor;

(c) measuring slip at said slip clutch of said auxiliary drive motor to pressurizing said slip clutches in response to the measured slip, thereby increasing the coupling of said motors with said conveyor while maintaining chains thereof taut;

(d) detecting a speed of at least one of said motors and upon the detected speed undershooting a lower limiting speed of a high speed setting switching said motors to a lower speed and upon overshooting an upper limiting speed of a low speed setting shifting said motors to a higher speed; and (e) detecting a thermal load on one of said motors and decoupling said one of said motors from said conveyor by the respective slip clutch upon the thermal load exceeding available cooling.

5. The method defined in claim 4 wherein said thermal load is detected by measuring a reduction of speed of said one of said motors on loading as a function of time.

6. The method defined in claim 4, further comprising the step of enabling slipping of at least one of said clutches upon a fall in speed of a respective motor below a lower limiting speed resulting from loading of said motor, thereby allowing acceleration of the respective motor, and thereafter closing the respective slip clutch.

7. The method defined in claim 4, further comprising the step of adjusting pressures in said slip clutches independently continuously during startup of said conveyor.

8. The method defined in claim 4, further comprising the step of adjusting pressures in said slip clutches independently in progressive steps during startup of said conveyor.

9. The method defined in claim 4, further comprising the step of adjusting pressures in said slip clutches independently in progressive steps during heavy run of said conveyor.

10. The method defined in claim 4, further comprising the step of adjusting pressures in said slip clutches independently in progressive steps during heavy run.

11. The method defined in claim 4, further comprising the step of adjusting pressures in said slip clutches independently in progressive steps during smooth blocking.

12. The method defined in claim 4, further comprising the step of adjusting pressures in said slip clutches independently in progressive steps during smooth blocking.

* * * * *